(12) United States Patent
Yu et al.

(10) Patent No.: US 10,942,733 B2
(45) Date of Patent: Mar. 9, 2021

(54) OPEN-SOURCE-LICENSE ANALYZING METHOD AND APPARATUS

(71) Applicant: CHINA UNIONPAY CO., LTD., Shanghai (CN)

(72) Inventors: Biao Yu, Shanghai (CN); Danni Jiang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 35 days.

(21) Appl. No.: 16/485,358

(22) PCT Filed: Nov. 15, 2017

(86) PCT No.: PCT/CN2017/111095
§ 371 (c)(1),
(2) Date: Aug. 12, 2019

(87) PCT Pub. No.: WO2018/149187
PCT Pub. Date: Aug. 23, 2018

(65) Prior Publication Data
US 2020/0026512 A1  Jan. 23, 2020

(30) Foreign Application Priority Data
Feb. 15, 2017 (CN) .......................... 201710081702.0

(51) Int. Cl.
*G06F 9/44* (2018.01)
*G06F 8/75* (2018.01)

(52) U.S. Cl.
CPC ..................................... *G06F 8/75* (2013.01)

(58) Field of Classification Search
None
See application file for complete search history.

(56) References Cited

U.S. PATENT DOCUMENTS

| 8,359,655 | B1 * | 1/2013 | Pham ...................... G06F 21/12 726/26 |
| 8,589,306 | B1 | 11/2013 | Morriss et al. |

(Continued)

FOREIGN PATENT DOCUMENTS

| CN | 101651564 A | 2/2010 |
| CN | 103440441 A | 12/2013 |
| CN | 106934254 A | 7/2017 |

OTHER PUBLICATIONS

The European Patent Office (EPO) the Extended European Search Report for 17896537.2 dated Apr. 20, 2020 7 Pages.

(Continued)

*Primary Examiner* — Anna C Deng
(74) *Attorney, Agent, or Firm* — Anova Law Group, PLLC

(57) ABSTRACT

Embodiments of the present disclosure relate to the field of computer technologies and, in particular, to an open-source-license analyzing method and apparatus, including: receiving a file-to-be-tested and a planning condition; detecting an open-source license involved in the file-to-be-tested; matching the detected open-source license with the planning condition to determine a first conflict between the detected open-source license and the planning condition; and generating a first risk assessment report based on the first conflict. The embodiments of the present disclosure are used to analyze and evaluate the risk of using open-source licenses.

15 Claims, 4 Drawing Sheets

(56) References Cited

U.S. PATENT DOCUMENTS

| | | | |
|---|---|---|---|
| 2007/0016532 A1 | 1/2007 | Zhang et al. | |
| 2008/0154965 A1* | 6/2008 | Pedersen | G06F 21/10 |
| 2009/0113391 A1* | 4/2009 | Bond | G06F 21/105 |
| | | | 717/120 |
| 2013/0097712 A1* | 4/2013 | Lori | G06F 21/105 |
| | | | 726/26 |
| 2014/0115720 A1 | 4/2014 | Yi | |
| 2014/0222686 A1* | 8/2014 | Levin | G06Q 50/18 |
| | | | 705/59 |
| 2016/0321770 A1* | 11/2016 | Didcock | G06Q 50/184 |
| 2020/0034516 A1* | 1/2020 | Gunyakti | G06F 21/10 |

OTHER PUBLICATIONS

Aminul Islam et al., Text Similarity Using Google Tri-grams, L. Kosseim and D. Inkpen (Eds.), Canadian AI, LNAI 7310, 2012, p. 312-317, Springer-Verlag, Berlin Heidelberg.

The World Intellectual Property Organization (WIPO) International Search Report for PCT/CN2017/111095 dated Feb. 12, 2018 6 Pages (including translation).

Hongbo Xu, et al., Study of Open Source License Tracking Process, Application Research of Computers, vol. 27, No. 8, Aug. 31, 2010, pp. 2972-2975.

Shiyun Wei, et al., Research on Webpage, Approximate Repetitive Detection Algorithm, Computer CD Software and Applications, No. 8, 2012, pp. 135-136.

Yuhao Wu, et al., A Method to Detect License Inconsistencies in Large-Scale Open Source Projects, 2015 12th Working Conference on Mining Software Repositories, IEEE, 2015, pp. 324-333.

* cited by examiner

OPEN-SOURCE-LICENSE ANALYZING METHOD AND APPARATUS

RELATED APPLICATIONS

This application is a national stage entry of International Patent Application No. PCT/CN2017/111095, filed on Nov. 15, 2017, which claims priority to Chinese Patent Application No. 201710081702.0, titled "OPEN-SOURCE-LICENSE ANALYZING METHOD AND APPARATUS," filed on Feb. 15, 2017, content of all of which is incorporated by reference in its entirety.

FIELD OF THE TECHNOLOGY

This application relates to the field of computer technologies and, specifically, to an open-source license analyzing method and apparatus.

BACKGROUND

Open-source licenses are licenses friendly to business applications. Open source means open source code, which provides the final source material in the production and development of products. Most of the open source mentioned is open-source software. The copyright holder of such software reserves some rights under the agreement and allows users to learn, modify, and improve the quality of the software. However, open-source software is not completely unrestricted. The most basic limitation is that open-source software forces anyone who uses and modifies the software to recognize the originator's copyright and the contributions of all participants. Anyone has the right to freely copy, modify, and use such source code, but may not set restrictions against any person or group or set restrictions against the commercial use of open-source software. An open-source license is such a legal document that guarantees these limitations.

The open-source license sets out the terms for modifying, copying, and redistributing source code. Open-source licenses currently in the industry have a large number and various types, and the size and scope of the rights granted to licensees by different open-source licenses vary. Because the same software often involves multiple open-source licenses, and different open-source licenses may conflict with each other or contrary to the users' intended goals, the use of open-source software or secondary development based on open-source software in a commercial environment often faces many potential legal issues and risks.

An open-source license detection tool can automatically locate and identify specific open-source licenses by scanning the software source code. However, existing license detection and analysis tools often can only perform simple detection, marking, and statistical operations, and cannot support further risk assessment and analysis, and these tools' content and risk analysis of open-source licenses need to be strengthened.

SUMMARY

The present disclosure provides an open-source license analyzing method and apparatus for analyzing and evaluating risks of using open-source licenses.

In first aspect, according to one embodiment of the present invention, an open-source-license analyzing method is provided, including the following steps: receiving a file-to-be-tested and a planning condition; detecting an open-source license involved in the file-to-be-tested; matching the detected open-source license with the planning condition to determine a first conflict between the detected open-source license and the planning condition; and generating a first risk assessment report based on the first conflict.

Optionally, the file-to-be-tested includes a plurality of documents for detection, and the detecting the open-source license involved in the file-to-be-tested comprises: for each document for detection, determining a vocabulary of the document for detection by using a k-shingle algorithm; counting a word frequency of each word in the vocabulary in the document for detection, and determining a first characteristic matrix of the document for detection; for an open-source license stored in a database, determining a word frequency of each word in the vocabulary in the open-source license, and determining a second characteristic matrix of the open-source license; calculating a text similarity between the document for detection and the open-source license according to the first characteristic matrix and the second characteristic matrix; and selecting the open-source license with a highest text similarity as the open-source license for the document for detection.

Optionally, after detecting the open-source license related to the file-to-be-tested, the method further comprises: performing conflict matching on multiple detected open-source licenses to determine a second conflict between the multiple detected open-source licenses;

generating a second risk assessment report based on the second conflict.

Optionally, after determining the first conflict between the detected open-source license and the planning condition, the method further comprises: determining a risk level corresponding to the first conflict; after the determining the second conflict between the multiple detected open-source licenses, the method further comprises: determining a risk level corresponding to the second conflict.

Optionally, the analyzing method also includes: receiving at least one of an identification and a fragment of an open-source license; determining any corresponding open-source licenses from the database according to the identification and the fragment; and generating a list of licenses based on the corresponding open-source licenses.

In second aspect, embodiments of the present disclosure provide an open-source license analyzing apparatus, including: a receiving unit configured to receive a file-to-be-tested and a planning condition; a detecting unit configured to detect an open-source license involved in the file-to-be-tested; a matching unit configured to perform conflict matching between the detected open-source license and the planning condition, and determine a first conflict between the detected open-source license and the planning condition; and a reporting unit configured to generate a first risk assessment report according to the first conflict.

Optionally, the file-to-be-tested includes a plurality of documents for detection, and the detecting unit is further configured to: for each document for detection, determine a vocabulary of the document for detection by using a k-shingle algorithm; count a word frequency of each word in the vocabulary in the document for detection, and determine a first characteristic matrix of the document for detection; for an open-source license stored in a database, determine a word frequency of each word in the vocabulary in the open-source license, and determine a second characteristic matrix of the open-source license; calculate a text similarity between the document for detection and the open-source license according to the first characteristic matrix and the second characteristic matrix; and select the open-source license with a highest text similarity is used as the open-source license for the test text.

Optionally, the matching unit is further configured to perform conflict matching on multiple detected open-source licenses, and determine a second conflict between the multiple detected open-source licenses; and the reporting unit is further configured to generate a second risk assessment report according to the second conflict.

Optionally, the matching unit is further configured to: determine a risk level corresponding to the first conflict; and determine a risk level corresponding to the second conflict.

Optionally, the receiving unit is further configured to receive at least one of an identification and a fragment of an open-source license; the matching unit is further configured to determine, according to the identification and the fragment, any corresponding open-source licenses from the database; and the reporting unit is further configured to generate a license list according to the corresponding open-source licenses.

In third aspect, embodiments of the present disclosure provide an electronic device, including: a processor, a memory, a transceiver, and a bus interface. The processor, the memory, and the transceiver are connected via the bus interface. The transceiver is configured to receive a file-to-be-tested and a planning condition. The processor is configured to: detect an open-source license involved in the file-to-be-tested; match the detected open-source license with the planning condition to determine a first conflict between the detected open-source license and the planning condition; and generate a first risk assessment report based on the first conflict. The memory is configured to store one or more executable programs, and store data used by the processor during operation; and the bus interface is configured to provide interfaces.

In fourth aspect, embodiments of the present disclosure provide a non-transitory computer-readable storage medium. The non-transitory computer-readable storage medium stores computer instructions for causing a computer to execute the method according to any method according to the first aspect.

In fifth aspect, embodiments of the present disclosure provide a computer program product including a computing program stored on a non-transitory computer-readable storage medium. The computer program includes program instructions and, when the program instructions are executed by a computer, causes the computer to execute the method according to any method according to the first aspect.

In the embodiments of the present invention, the server receives the file-to-be-tested uploaded by the user, and detects any open-source license involved in the file-to-be-tested. At the same time, the server also receives the planning condition inputted by the user, which is the relevant condition for the future planning of the software project. Conflict matching is performed between the detected open-source license and the planning condition, to determine the conflict between the content of the open-source license involved and the planning condition of the software. Finally, the first risk assessment report is generated according to the first conflict, and is fed back to the user. Thus, according to the embodiments of the present disclosure, an open-source license included in the software can be automatically identified, the conflict between the open-source license and the planning condition can be determined, and finally a risk assessment report can be generated based on the conflict, thereby providing support and reference to the user for better tracking the software development and making a reasonable decision about the open-source software.

BRIEF DESCRIPTION OF THE DRAWINGS

In order to more clearly illustrate the technical solutions in the embodiments of the present invention, the drawings used in the description of the embodiments will be briefly described below. It is obvious that the drawings in the following description are only some embodiments of the present invention, and those skilled in the art can obtain other drawings based on these drawings without inventive efforts.

DESCRIPTION OF EMBODIMENTS

To make clearer of the objectives, technical solutions, and advantages of the present disclosure, the followings further describe the present disclosure in detail with reference to the accompanying drawings. Obviously, the described embodiments are only some but not all of the embodiments of the present disclosure. All other embodiments obtained by a person of ordinary skill in the art based on the disclosed embodiments of the present disclosure without creative efforts are within the scope of the present disclosure.

Figure 1:
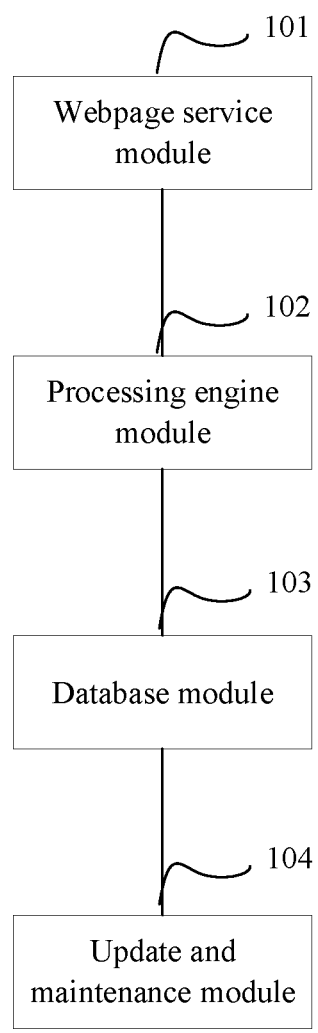
FIG. 1 illustrates a system structural diagram according to an embodiment of the present invention.

As shown in FIG. 1, a system architecture applicable to an embodiment of the present disclosure includes a webpage service module 101, a processing engine module 102, a database module 103, and an update and maintenance module 104. The web service module 101, the processing engine module 102, the database module 103, and the update and maintenance module 104 may be integrated into one server or may be modules in different servers. The server may be a network apparatus such as a computer. Further, the webpage service module 101, the processing engine module 102, the database module 103, and the update and maintenance module 104 may use cloud computing technology for information processing.

The web service module 101 provides a user with an entry point for various functions including the open-source-license information query, the open-source license detection, and the risk assessment, etc. That is, the user may input files-to-be-tested and the planning conditions to the server through the web service module 101. In addition, the web service module 101 may display query results and/or analysis results to the user in the form of a list(s), a chart(s), a text(s), and the like.

The processing engine module 102 retrieves the information satisfying the conditions from the database module 103 according to the user's input, and feeds back the result back to the web service module 101, thereby presenting to the user in different forms such as a search list, detailed information, and the like. The processing engine module 102 may support keyword fuzzy query, which supports searching for related data through character segments.

The processing engine module 102 may also detects open-source license(s) involved in the file-to-be-tested by analyzing the received software source code, and detects files with copyright and files without copyright, to generate an open-source-license usage report and feeds back to the user in the form of a PDF file or a chart, etc. After detecting open-source licenses, based on the software project planning conditions set by the user or inputted by the user, and the conflict rules pre-set by an expert, the processing engine module 102 may detect conflicting open-source licenses in the file-to-be-tested, or conflicts between open-source licenses and the planning conditions. Based on the detection, the processing engine module 102 may analyze any pre-existing legal risks, generate a risk assessment report, and feed back to the user in the form of a PDF file or chart.

The database module 103 can be divided into two parts: an open-source license information repository and a conflict rule repository. The open-source license information repository maintains information on the terms of the agreement, applicable scenarios, usage conditions, and restrictions of various open-source licenses available on the market. The conflict rule repository saves conflict rule expressions between different open-source licenses. Based on these expressions, any known conflicts between two open-source licenses can be determined. On the other hand, the conflict rule repository also holds business scenario expressions not applicable to various open-source licenses. Based on these expressions, potential conflicts between related options of the project planning and open-source licenses can be determined.

The update and maintenance module 104 allows the user or administrator to perform update and maintenance operations on contents of the database module 103. The open-source license information and conflict rules can be imported in batches by means of file importing, or the required information can be manually added by manual input. In addition, operations that delete and modify data may also be supported.

Figure 2:
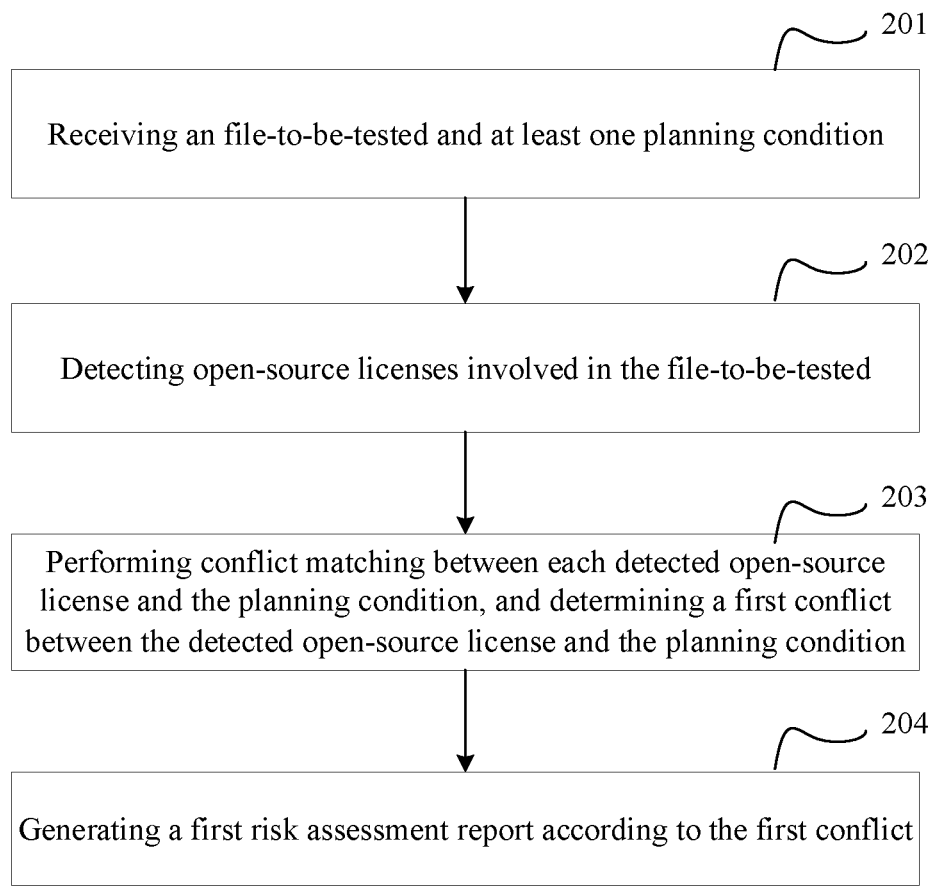
FIG. 2 illustrates a flowchart of an open-source-license analyzing method according to an embodiment of the present invention.

FIG. 2 illustrates a flowchart of an open-source-license analyzing method according to an embodiment of the present disclosure. As shown in FIG. 2, an open-source-license analyzing method provided by an embodiment of the present disclosure includes the following steps.

Step 201: Receiving an file-to-be-tested and at least one planning condition.

Step 202: Detecting one or more open-source licenses involved in the file-to-be-tested;

Step 203: Performing conflict matching between each detected open-source license and the planning condition, and determining a first conflict between the detected open-source license and the planning condition.

Step 204: Generating a first risk assessment report according to the first conflict.

In one embodiment, the server receives the file-to-be-tested uploaded by the user, and detects any open-source license involved in the file-to-be-tested. At the same time, the server also receives the planning condition inputted by the user, which is the relevant condition for the future planning of the software project. The conflict between the detected open-source license and the planning condition can be determined, that is, the conflict between the content of the open-source license involved and the planning condition of the software is determined. Finally, the first risk assessment report is generated according to the first conflict, and is fed back to the user. Thus, according to the embodiments of the present disclosure, an open-source license included in the software can be automatically identified, the conflict between the open-source license and the planning condition can be determined, and finally a risk assessment report can be generated based on the conflict, thereby providing support and reference to the user for better tracking the software development and making a reasonable decision about the open-source software.

For the detection of open-source licenses, existing solutions generally implement a method based on keyword matching, and there is a problem that the identification accuracy is not high, and there may be a situation where a license is missed or error occurs. In the embodiments of the present disclosure, detecting an open-source license involved in the file-to-be-tested includes the followings.

A file-to-be-tested includes a plurality of documents or texts for detection, and for each document for detection, a vocabulary of the document for detection is determined by using a k-shingle algorithm.

Counting a word frequency of each word in the vocabulary in the document for detection, and determining a first characteristic matrix of the document for detection.

For each open-source license stored in the database, determining a word frequency of each word in the vocabulary in the open-source license, and determining a second characteristic matrix of the open-source license.

Calculating a text similarity between the document for detection and each open-source license according to the first characteristic matrix and the second characteristic matrix.

The open-source license with the highest text similarity is used as the open-source license for the document for detection.

Thus, with respect to the problem of low identification accuracy for current open-source-license detection tools, the disclosed solution can help users to identify potential open-source license information by calculating the text similarity, reducing the probability of missed and mis-detected open-source licenses. In addition to the text similarity, there are also methods based on regular expressions, but the method of using regular expressions needs to manually set a large number of rules, and situations where the open-source licenses cannot be classified may easily occur. The method of text similarity may be able to overcome these issues above.

Specifically, in the embodiments of the present disclosure, the K value of the k-shingle algorithm can be defined based on the text characteristics of different open-source licenses, and the Jaccard Similarity algorithm can be used to calculate the similarity between the document for detection and each open-source license in the database, thereby having better time efficiency, accuracy, and recallability.

Because the file-to-be-tested may include a plurality of documents or texts for detection, a document for detection may be an open-source license related to the file-to-be-tested, or may be source code, or other related data. In the embodiments of the present disclosure, the text similarities between the document for detection and the open-source licenses in the database are detected, and any open-source licenses in the documents for detection can be detected.

For a document for detection, the method for calculating the text similarity according to the embodiments of the present disclosure includes followings.

1. The vocabulary of the document for detection is statistically detected through the k-shingle algorithm, where k is a self-defined variable indicating that k characters in the document for detection are extracted. The document or text for detection is traversed and k characters are saved sequentially. For example, if the text content is abcdefg, and k=2, the vocabulary is obtained as: ab, bc, cd, de, ef, fg.

2. Counting the word frequency of each word in the vocabulary in the document for detection, and constructing a first characteristic matrix of the document for detection. At the same time, for each word in the vocabulary, counting the word frequency in an open-source license from the database, constructing a second characteristic matrix of each open-source license from the database.

3. According to the first characteristic matrix and the second characteristic matrix, a Jaccard Similarity algorithm is used to calculate the text similarity between the document for detection and each open-source license in the database. The Jaccard Similarity algorithm divides the intersection of two sets by the union of the two sets, and obtains the similarity of the two sets. In the embodiments of the present disclosure, the two sets are respectively the text/document for detection and the open-source license text, and the words appearing in the text are the elements in the set, so calculating the similarity between the document/text for detection and the open-source license is to calculate the similarity between the document/text for detection and the open-source license based on the first characteristic matrix of the document for detection and the second characteristic matrix of each open-source license.

4. Using the text similarity between the document for detection and each open-source license calculated above, selecting the open-source license with the highest text similarity as the matching result.

After detecting an open-source license involved in the file-to-be-tested, based on the usage information of the open-source license and the software project planning condition inputted by the user, whether there is a conflict between the open-source license and the planning condition can be analyzed to determine any conflict exits or what conflict exists. Specifically, open-source license usage information, such as the GPL (GNU General Public License, GNU General Public License), BSD (Berkeley Software Distribution, Berkeley Software Suite), Apache (Apache Website Server Software) and other open-source licenses, and software project planning conditions (such as whether there is closed-source requirement in the future, whether to introduce other licenses, etc.) as an inputted condition, are matched with the rule expressions in the conflict-rule repository one by one. For example, a rule expression may be:

```
If ((LGPL||Mozilla||GPL)&& (closed source==true))
    {Conflict=true; Risk Level=high;}
```

The above code indicates that if there is a license agreement of LGPL, Mozilla or GPL type, and the planning condition for software project development is closed-source software, there is an agreement conflict, and the risk level is high.

In addition to the conflict between the open-source license and the planning condition, in the embodiments of the present disclosure, conflicts between open-source licenses are also analyzed. After the detecting the open-source licenses related to the file-to-be-tested, the analyzing method further includes the followings.

Performing conflict matching on the multiple detected open-source licenses to determine a second conflict between the multiple detected open-source licenses.

Generating a second risk assessment report based on the second conflict.

Open-source licenses can be divided into five categories. 1. the licensor can use the software anywhere and for any purpose; 2. the licensor can only freely copy the open-source software; 3. the licensor can only freely copy or redevelop the software; 4. the licensor can freely access the software and use the source code of the software, but cannot combine them with other components; 5. the licensor is free to combine the open-source software with other software. The use of conflicting licenses may have a major impact on the software development, especially commercial software development. Therefore, in the embodiments of the present disclosure, conflicting open-source licenses are detected to determine conflict between two or more open-source licenses involved in the same file-to-be-tested. Specifically, the detected open-source licenses are matched with the rule expression(s) in the conflict rule repository to determine whether there is a conflict between the open-source licenses. For example, the rule expression can be:

```
If (GPL&&BSD){Conflict=true; Risk
    Level=medium;}
```

The above code indicates that if both GPL and BSD agreements exist, there is an agreement conflict, and the risk level is medium.

Further, after determining the first conflict between the detected open-source license and the planning condition, the analyzing method further includes: determining a risk level corresponding to the first conflict.

After determining the second conflict between the detected multiple open-source licenses, the method further includes: determining a risk level corresponding to the second conflict.

In the embodiments of the present disclosure, various conflicts may have different risk levels, so as to make it convenient for the open-source software user to make a reasonable decision on the file-to-be-tested and the open-source licenses involved.

In addition to detecting an open-source license, in the embodiments of the present disclosure, a matching license list may be retrieved based on the name/identifier or a fragment(s) of an open-source license inputted by the user. The analyzing method may further include the followings.

Receiving an identifier and/or a fragment of an open-source license.

Determining any corresponding open-source licenses from the database according to the identifier and/or the fragment.

Generating a list of licenses based on all corresponding open-source licenses.

Thus, it makes easy for users to quickly query various information about each open-source license. The user clicks on a single entry in the list to get to the details page of the corresponding open-source license. The details include an introduction to the open-source license content, typical application cases, usage conditions, and restrictions, etc.

In addition, because the rules in the conflict rule repository of the database may be constantly increasing, and there may be multiple variants of a same rule, the detection/analysis may be inefficient if each analysis traverses the entire conflict rule repository. In the embodiments of the present disclosure, the analysis mode may be optimized by establishing a classification index, and the classification index can be set to the conflict rule repository according to different types of open-source licenses, and a rule set associated with a specific type of open-source license can be quickly located through the index list, thereby improving analysis efficiency.

A specific classification index method may use a graph-based index structure, and the graph is stored in the format of an adjacency list. The header of the list can be defined as an open-source license or other entity, and edges can be defined as the rules between different open-source licenses. This solution can quickly locate and query rules under specific conditions, and is easy to dynamically expand the rules for easy updating and maintenance.

Figure 3:
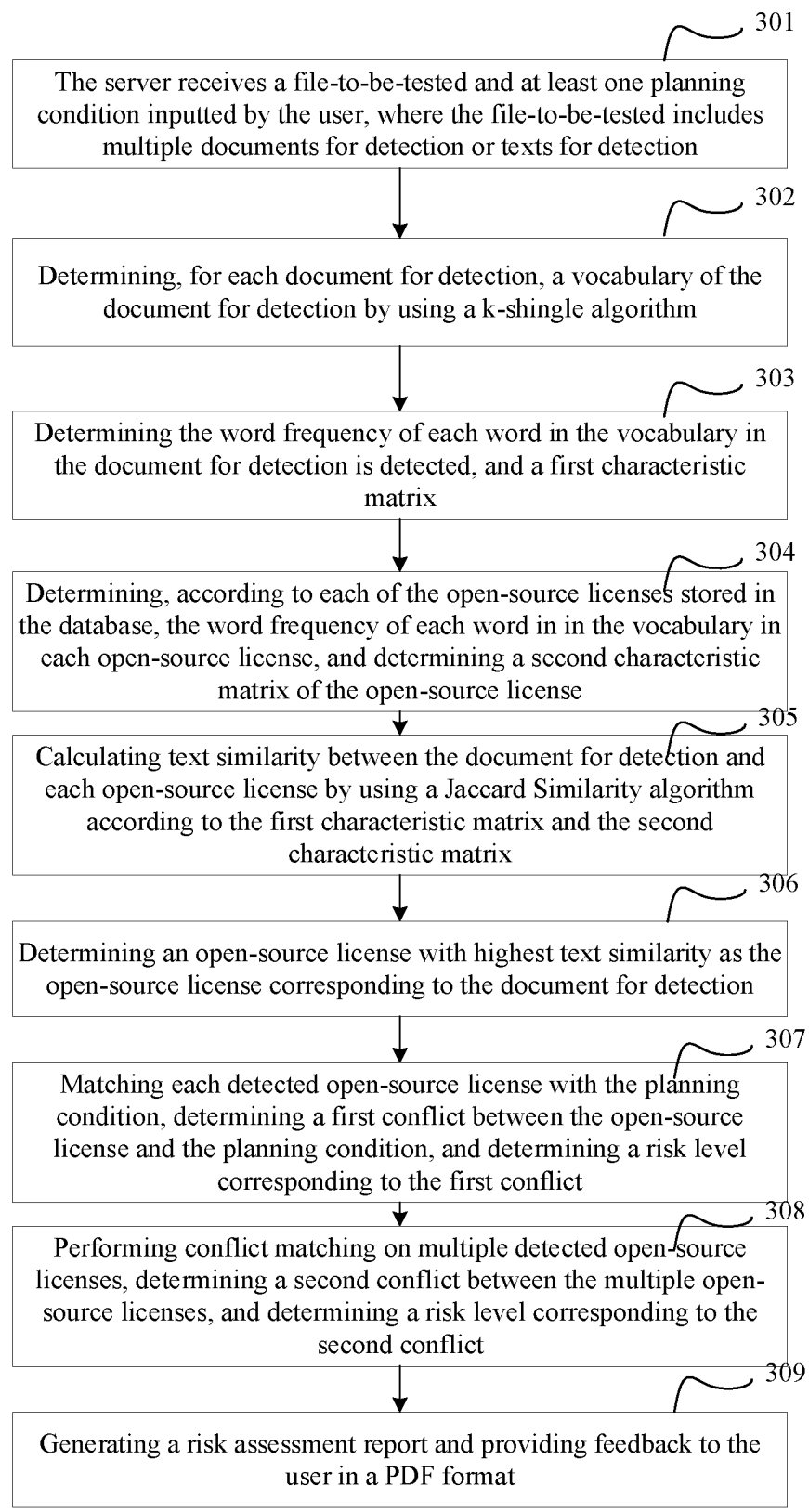
FIG. 3 illustrates a flowchart of another open-source-license analyzing method according to an embodiment of the present invention.

In order to understand the present disclosure more clearly, the foregoing process is described in detail in the following specific embodiments. The specific steps are as shown in FIG. 3, including followings.

Step 301: The server receives a file-to-be-tested and at least one planning condition inputted by the user, where the file-to-be-tested includes a plurality of documents for detection or texts for detection.

Step 302: Determining, for each document for detection, a vocabulary of the document for detection by using a k-shingle algorithm.

Step 303: Determining the word frequency of each word in the vocabulary in the document for detection, and a first characteristic matrix.

Step 304: Determining, according to each of the open-source licenses stored in the database, the word frequency of each word in the vocabulary in each open-source license, and determining a second characteristic matrix of the open-source license.

Step 305: Calculating text similarity between the document for detection and each open-source license by using a Jaccard Similarity algorithm according to the first characteristic matrix and the second characteristic matrix.

Step 306: Determining an open-source license with highest text similarity as the open-source license corresponding to the document for detection.

Step 307: Matching each detected open-source license with the planning condition, determining a first conflict between the open-source license and the planning condition, and determining a risk level corresponding to the first conflict.

Step 308: Performing conflict matching on multiple detected open-source licenses, determining a second conflict between the multiple open-source licenses, and determining a risk level corresponding to the second conflict.

Step 309: Generating a risk assessment report and providing feedback to the user in a PDF format.

Figure 4:
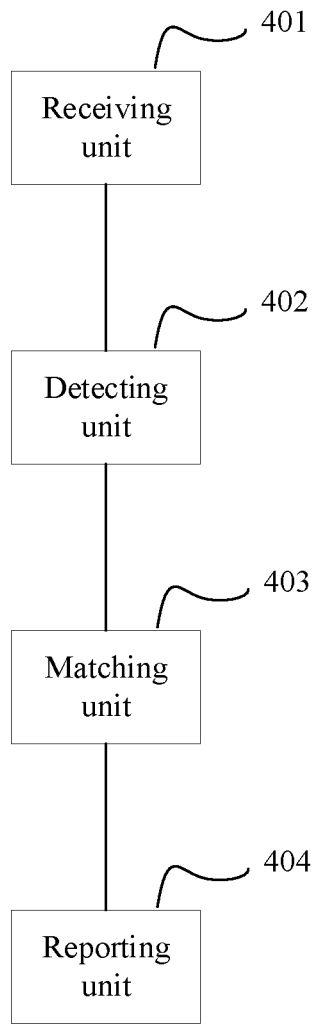
FIG. 4 illustrates a structural diagram of an open-source-license analyzing apparatus according to an embodiment of the present invention.

FIG. 4 is a schematic structural diagram of an open-source-license analyzing apparatus according to an embodiment of the present disclosure.

As shown in FIG. 4, an open-source-license analyzing apparatus according to an embodiment of the present disclosure includes the followings.

A receiving unit 401 that is configured to receive at least one file-to-be-tested and at least one planning condition.

A detecting unit 402 that is configured to detect one or more open-source license involved in the file-to-be-tested.

A matching unit 403 that is configured to: perform conflict matching between the detected open-source license and the planning condition, and determine a first conflict between the detected open-source license and the planning condition.

A reporting unit 404 that is configured to generate a first risk assessment report according to the first conflict.

Optionally, the detecting unit 402 is specifically configured to: where the file-to-be-tested includes a plurality of documents/texts for detection, for each document for detection, determine a vocabulary of the document for detection by using a k-shingle algorithm; count a word frequency of each word in the vocabulary in the document for detection, and determine a first characteristic matrix of the document for detection; determine a word frequency of each word in the vocabulary in the open-source license for each open-source license stored in the database, and determine a second characteristic matrix of the open-source license; calculate a text similarity between the document for detection and each open-source license according to the first characteristic matrix and the second characteristic matrix; and select the open-source license with the highest text similarity as the open-source license for the document for detection.

Optionally, the matching unit 403 is further configured to perform conflict matching on the multiple detected open-source licenses involved in the plurality of documents for detection, and determine a second conflict between the multiple detected open-source licenses.

The reporting unit 404 is further configured to generate a second risk assessment report according to the second conflict.

Optionally, the matching unit 403 is further configured to: determine a risk level corresponding to the first conflict; and determine a risk level corresponding to the second conflict.

Optionally, the receiving unit 401 is further configured to receive an identifier and/or a fragment of an open-source license.

The matching unit 403 is further configured to determine, according to the identifier and/or the fragment, any corresponding open-source licenses from the database.

Optionally, the reporting unit 404 is further configured to generate a license list according to the corresponding open-source licenses.

Figure 5:
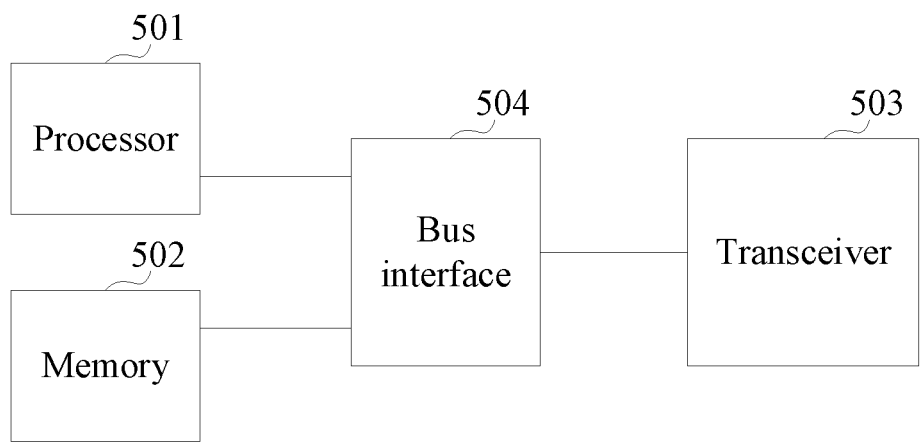
FIG. 5 illustrates a structural diagram of an electronic device according to an embodiment of the present invention.

Similarly, the present disclosure further provides an electronic device, as shown in FIG. 5, including a processor 501, a memory 502, a transceiver 503, and a bus interface 504, etc. The processor 501, the memory 502, and the transceiver 503 are connected via the bus interface 504.

The transceiver 503 is configured to receive a file-to-be-tested and a planning condition.

The processor 501 is configured to read a computer program in the memory, and execute the following method: detecting an open-source license involved in the file-to-be-tested; and matching the detected open-source license with the planning condition to determine a first conflict between the detected open-source license and the planning condition; and generating a first risk assessment report based on the first conflict.

The memory 502 is configured to store one or more executable computer programs, and may store data used by the processor when performing executions.

The bus interface 504 is configured to provide an interface.

The processor 501 is specifically configured to: where the file-to-be-tested includes a plurality of documents for detection, for each document for detection, determine a vocabulary of the document for detection by using a k-shingle algorithm, count a word frequency of each word in the vocabulary in the document for detection, and determine a first characteristic matrix of the document for detection; for an open-source license stored in a database, determine a word frequency of each word in the vocabulary in the open-source license, and determine a second characteristic matrix of the open-source license; calculate a text similarity between the document for detection and the open-source license according to the first characteristic matrix and the second characteristic matrix; and select the open-source license with a highest text similarity as the open-source license for the document for detection.

The processor 501 is further configured to perform multiple detected open-source licenses to determine a second conflict between the multiple detected open-source licenses.

The processor 501 is further configured to generate a second risk assessment report according to the second conflict.

Optionally, the processor 501 is further configured to: determine a risk level corresponding to the first conflict; and determine a risk level corresponding to the second conflict.

Optionally, the processor 501 is further configured to: receive at least one of an identifier and a fragment of an open-source license; determine any corresponding open-source licenses from the database according to the identifier and the fragment; and generate a list of licenses based on the corresponding open-source licenses.

Embodiments of the present disclosure further provide a non-transitory computer-readable storage medium. The non-transitional computer-readable storage medium stores computer instructions, and the computer instructions are used to cause a computer executing the disclosed open-source-license analyzing methods according to any embodiments in a first aspect.

Embodiments of the present disclosure further provide a computer program product. The computer product includes computer programs stored on a non-transitional computer-readable storage medium. The computer programs include computer instructions, and the computer instructions are used to cause a computer executing the disclosed open-source-license analyzing methods according to any embodiments in a first aspect.

The present disclosure has been described with reference to flowchart illustrations and/or block diagrams of methods, apparatus (system), and computer program products according to embodiments of the present invention. It will be understood that each flow and/or each block of the flowchart illustrations and/or block diagrams, or any combination of the flows and/or blocks of the flowchart illustrations and/or block diagrams can be implemented in computer program instructions. These computer program instructions can be provided to a processor of a general-purpose computer, special purpose computer, embedded processor, or other programmable data processing apparatus to produce a machine for the execution of the instructions. With the execution by the processor of the computer or other programmable data processing apparatus, functions specified in one or more flows and/or one or more blocks of the flowchart illustrations and/or block diagrams can be implemented.

The computer program instructions can also be stored in a computer readable memory that can direct the computer or other programmable data processing apparatus to operate in a particular manner, such that the instructions stored in the computer readable memory produce an article of manufacture comprising the instruction apparatus. The apparatus implements the functions specified in one or more flows and/or one or more blocks of the flowchart illustrations and/or block diagrams.

These computer program instructions can also be loaded onto the computer or other programmable data processing apparatus such that a series of operational steps are performed on the computer or other programmable apparatus to produce computer-implemented processing for execution on the computer or other programmable apparatus. The instructions provide steps for implementing the functions specified in one or more flows and/or one or more blocks of the flowchart illustrations and/or block diagrams.

While certain embodiments of the present invention have been described, it is understood that a person of ordinary skill in the art can modify or change the embodiments after knowing the basic inventive concept. Therefore, the appended claims are intended to be interpreted as including the disclosed embodiments and the modifications and changes falling within the scope of the present invention.

It is apparent that those skilled in the art can make various modifications and variations to the invention without departing from the spirit and scope of the invention. Thus, it is intended that the present invention cover the modifications and variations of the invention.

What is claimed is:

1. An open-source-license analyzing method, comprising:
   receiving a file-to-be-tested and a planning condition, wherein the file-to-be-tested includes a plurality documents for detection;
   detecting an open-source license involved in the file-to-be-tested, wherein detecting the open-source license involved in the file-to-be-teste comprises:
      determining, for each document of the plurality documents for detection, a vocabulary of the document for detection by using a k-shingle algorithm,
      counting a word frequency of each word in the vocabulary in the document for detection, and determining a first characteristic matrix of the document for detection based on the counted the word frequency of the each word in the vocabulary in the document for detection,
      determining, for an open-source license stored in a database, a word frequency of each word in the vocabulary in the open-source license, and determining a second characteristic matrix of the open-source license based on the determined the word frequency of the each word in the vocabulary in the open-source license,
      calculating a text similarity between the document for detection and the open-source license according to the first characteristic matrix of the document for the detection and the second characteristic matrix of the open-source license, and
      selecting an open-source license with a highest text similarity between the document for detection and the open-source license as the detected open-source license for the document for detection;
   matching the detected open-source license with the planning condition to determine a first conflict between the detected open-source license and the planning condition; and
   generating a first risk assessment report based on the first conflict.

2. The method according to claim 1, wherein, after detecting the open-source license involved in the file-to-be-tested, the method further comprises:
   performing conflict matching on multiple detected open-source licenses to determine a second conflict between the multiple detected open-source licenses; and
   generating a second risk assessment report based on the second conflict.

3. The method according to claim 2, wherein:
   after determining the first conflict between the detected open-source license and the planning condition, the method further comprises:
   determining a risk level corresponding to the first conflict; and
   after the determining the second conflict between the multiple detected open-source licenses, the method further comprises:
   determining a risk level corresponding to the second conflict.

4. The method according to claim 1, further comprising:
   receiving at least one of an identifier and a fragment of an open-source license;

determining any corresponding open-source licenses from the database according to the identifier and the fragment; and generating a list of licenses based on the corresponding open-source licenses.

5. An open-source-license analyzing apparatus, comprising:

a receiving unit configured to receive a file-to-be-tested and a planning condition, wherein the file-to-be-tested includes a plurality documents for detection;

a detecting unit configured to detect an open-source license involved in the file-to-be-tested, wherein the detecting unit configured to detect the open-source license involved in the file-to-be-tested further configured to:

determine, for each document of the plurality documents for detection, a vocabulary of the document for detection by using a k-shingle algorithm, count a word frequency of each word in the vocabulary in the document for detection, and determine a first characteristic matrix of the document for detection based on the counted the word frequency of the each word in the vocabulary in the document for detection, determine, for an open-source license stored in a database, a word frequency of each word in the vocabulary in the open-source license, and determine a second characteristic matrix of the open-source license based on the determined the word frequency of the each word in the vocabulary in the open-source license, calculate a text similarity between the document for detection and the open-source license according to the first characteristic matrix of the document for the detection and the second characteristic matrix of the open-source license, and select an open-source license with a highest text similarity between the document for detection and the open-source license as the detected open-source license for the document for detection;

a matching unit configured to perform conflict matching between the detected open-source license and the planning condition, and determine a first conflict between the detected open-source license and the planning condition; and a reporting unit configured to generate a first risk assessment report according to the first conflict.

6. The apparatus according to claim 5, wherein:
the matching unit is further configured to perform conflict matching on multiple detected open-source licenses, and determine a second conflict between the multiple detected open-source licenses; and
the reporting unit is further configured to generate a second risk assessment report according to the second conflict.

7. The apparatus according to claim 6, wherein the matching unit is further configured to:
determine a risk level corresponding to the first conflict; and determine a risk level corresponding to the second conflict.

8. The apparatus according to claim 5, wherein:
the receiving unit is further configured to receive at least one of an identifier and a fragment of an open-source license;

the matching unit is further configured to determine, according to the identifier and the fragment, any corresponding open-source licenses from the database; and the reporting unit is further configured to generate a license list according to the corresponding open-source licenses.

9. An electronic device, comprising:
a processor, a memory, a transceiver, and a bus interface, wherein:
the processor, the memory, and the transceiver are connected via the bus interface;
the transceiver is configured to receive a file-to-be-tested and a planning condition, wherein the file-to-be-tested includes a plurality documents for detection;
the processor is configured to:
detect an open-source license involved in the file-to-be-tested, wherein detect the open-source license involved in the file-to-be-tested is further configured to:
determine, for each document of the plurality documents for detection, a vocabulary of the document for detection by using a k-shingle algorithm,
count a word frequency of each word in the vocabulary in the document for detection, and determine a first characteristic matrix of the document for detection based on the counted a word frequency of each word in the vocabulary in the document for detection,
determine, for an open-source license stored in a database, a word frequency of each word in the vocabulary in the open-source license, and determining a second characteristic matrix of the open-source license based on the determined a word frequency of each word in the vocabulary in the open-source license,
calculate a text similarity between the document for detection and the open-source license according to the first characteristic matrix of the document for the detection and the second characteristic matrix of the open-source license, and
select an open-source license with a highest text similarity between the document for detection and the open-source license as the detected open-source license for the document for detection;
match the detected open-source license with the planning condition to determine a first conflict between the detected open-source license and the planning condition; and
generate a first risk assessment report based on the first conflict;
the memory is configured to store one or more executable programs, and to store data used by the processor during operation; and
the bus interface is configured to provide interfaces.

10. The device according to claim 9, wherein the processor is further configured to:
perform perconflict matching on multiple detected open-source licenses to determine a second conflict between the multiple detected open-source licenses; and
generate a second risk assessment report based on the second conflict.

11. The device according to claim 10, wherein the processor is further configured to:
determine a risk level corresponding to the first conflict; and
determine a risk level corresponding to the second conflict.

12. The device according to claim 9, wherein the processor is further configured to:
- receive at least one of an identifier and a fragment of an open-source license;
- determine any corresponding open-source licenses from the database according to the identifier and the fragment; and
- generate a list of licenses based on the corresponding open-source licenses.

13. A non-transitory computer-readable storage medium, wherein the non-transitory computer-readable storage medium stores computer instructions for causing a computer to execute a method comprising:
- receiving a file-to-be-tested and a planning condition, wherein the file-to-be-tested includes a plurality documents for detection;
- detecting an open-source license involved in the file-to-be-tested, wherein the detecting the open-source license involved in the file-to-be-tested comprises:
  - determining, for each document of the plurality documents for detection, a vocabulary of the document for detection by using a k-shingle algorithm,
  - counting a word frequency of each word in the vocabulary in the document for detection, and determining a first characteristic matrix of the document for detection based on the counted the word frequency of the each word in the vocabulary in the document for detection,
  - determining, for an open-source license stored in a database, a word frequency of each word in the vocabulary in the open-source license, and determining a second characteristic matrix of the open-source license based on the determined the word frequency of the each word in the vocabulary in the open-source license,
  - calculating a text similarity between the document for detection and the open-source license according to the first characteristic matrix of the document for the detection and the second characteristic matrix of the open-source license, and
  - selecting the open-source license with a highest text similarity between the document for detection and the open-source license as the detected open-source license for the document for detection;
- matching the detected open-source license with the planning condition to determine a first conflict between the detected open-source license and the planning condition; and
- generating a first risk assessment report based on the first conflict.

14. The non-transitory computer-readable storage medium according to claim 13, wherein, after detecting the open-source license involved in the file-to-be-tested, the method further comprises:
- performing conflict matching on multiple detected open-source licenses to determine a second conflict between the multiple detected open-source licenses; and
- generating a second risk assessment report based on the second conflict.

15. The non-transitory computer-readable storage medium according to claim 14, wherein:
- after determining the first conflict between the detected open-source license and the planning condition, the method further comprises:
- determining a risk level corresponding to the first conflict; and
- after the determining the second conflict between the multiple detected open-source licenses, the method further comprises:
- determining a risk level corresponding to the second conflict.

* * * * *